(12) United States Patent
Lin

(10) Patent No.: US 11,820,673 B2
(45) Date of Patent: Nov. 21, 2023

(54) WATER PURIFIER WITH LEAKPROOF FUNCTION

(71) Applicant: KEMFLO INTERNATIONAL CO., LTD., Pingtung (TW)

(72) Inventor: Sheng-Nan Lin, Pingtung (TW)

(73) Assignee: KEMFLO INTERNATIONAL CO., LTD., Pingtung (TW)

( * ) Notice: Subject to any disclaimer, the term of this patent is extended or adjusted under 35 U.S.C. 154(b) by 218 days.

(21) Appl. No.: 17/504,622

(22) Filed: Oct. 19, 2021

(65) Prior Publication Data
US 2023/0122433 A1    Apr. 20, 2023

(51) Int. Cl.
*C02F 1/00* (2023.01)
*B01D 27/10* (2006.01)

(52) U.S. Cl.
CPC .......... *C02F 1/001* (2013.01); *B01D 27/103* (2013.01); *B01D 27/106* (2013.01); *C02F 1/003* (2013.01); *C02F 2201/004* (2013.01); *C02F 2201/005* (2013.01); *C02F 2201/006* (2013.01); *C02F 2201/007* (2013.01); *C02F 2301/04* (2013.01)

(58) Field of Classification Search
CPC .. B01D 27/103; B01D 27/106; B01D 35/147; C02F 1/001; C02F 1/003; C02F 2201/004; C02F 2201/005; C02F 2201/006; C02F 2201/007; C02F 2301/04
See application file for complete search history.

(56) References Cited

U.S. PATENT DOCUMENTS

| 3,907,688 A * | 9/1975 | Close ................... B01D 35/043 210/444 |
| 10,071,326 B2 * | 9/2018 | Schmoll ................. B01D 35/30 |
| 2006/0254971 A1 * | 11/2006 | Tubby ................... B01D 27/08 210/235 |

* cited by examiner

Primary Examiner — Liam Royce

(57) ABSTRACT

A water purifier includes a filter head, a flow channel control module, and a filter element. The flow channel control module includes a waterway board and a flow manifold. The waterway board is provided with a water flow channel. The flow manifold is provided with a first passage and a second passage. When the flow manifold is driven by the filter element and rotated relative to the waterway board to a first position where the first passage is connected to the water flow channel, the flow channel control module is switched to a first flow channel waterway mode (or filter mode). When the flow manifold is driven by the filter element and rotated to a second position where the second passage is connected to the water flow channel, the flow channel control module is switched to a second flow channel waterway mode (or replacement mode).

10 Claims, 9 Drawing Sheets

WATER PURIFIER WITH LEAKPROOF FUNCTION

BACKGROUND OF THE INVENTION

1. Field of the Invention

The present invention relates to a purifying device and, more particularly, to a water purifier.

2. Description of the Related Art

A conventional water purifier comprises a filter head and a filter element. The filter element is connected to the filter head by rotating. However, when the user wishes to replace the filter element, the water source must be turned off before replacement, thereby causing inconvenience to the user. Another conventional water purifier further comprises a valve joint mounted between the filter head and the filter element. The filter element is mounted on the valve joint. However, leakage easily produces between the filter element and the valve joint.

BRIEF SUMMARY OF THE INVENTION

The primary objective of the present invention is to provide a water purifier with an automatic waterway control system to switch an upper waterway and a lower waterway so as to provide a leakproof function.

In accordance with the present invention, there is provided a water purifier comprising a filter head, a flow channel control module, a housing, and a filter element. The filter head includes a water inlet port and a water outlet port. The flow channel control module is mounted in the filter head and includes a waterway board and a flow manifold arranged under the waterway board. The waterway board is fixed in the filter head. The waterway board is juxtaposed to the flow manifold. The waterway board is provided with a water flow channel. The water flow channel of the waterway board has a first end provided with a water inlet hole connected to the water inlet port of the filter head and a second end provided with a water outlet hole connected to the water outlet port of the filter head. The flow manifold is rotatable relative to the waterway board. The flow manifold is provided with a first passage and a second passage. The housing is hollow and has a first opening and a second opening. The first opening of the housing is connected with the filter head. The filter element is detachably connected with the flow manifold of the flow channel control module and is rotated in concert with the flow manifold. When the filter element is mounted on the flow manifold of the flow channel control module, the flow manifold is driven by the filter element and rotated relative to the waterway board to a first position where the first passage of the flow manifold is connected to the water flow channel of the waterway board, and the flow channel control module is switched to a first flow channel waterway mode (or filter mode). When the filter element is removed from the flow manifold of the flow channel control module, the flow manifold is driven by the filter element and rotated relative to the waterway board to a second position where the second passage of the flow manifold is connected to the water flow channel of the waterway board, and the flow channel control module is switched to a second flow channel waterway mode (or replacement mode).

According to the primary advantage of the present invention, the flow channel control module will not cause a leakage during the switching process between the first flow channel waterway mode and the second flow channel waterway mode so that the water will not leak outward.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
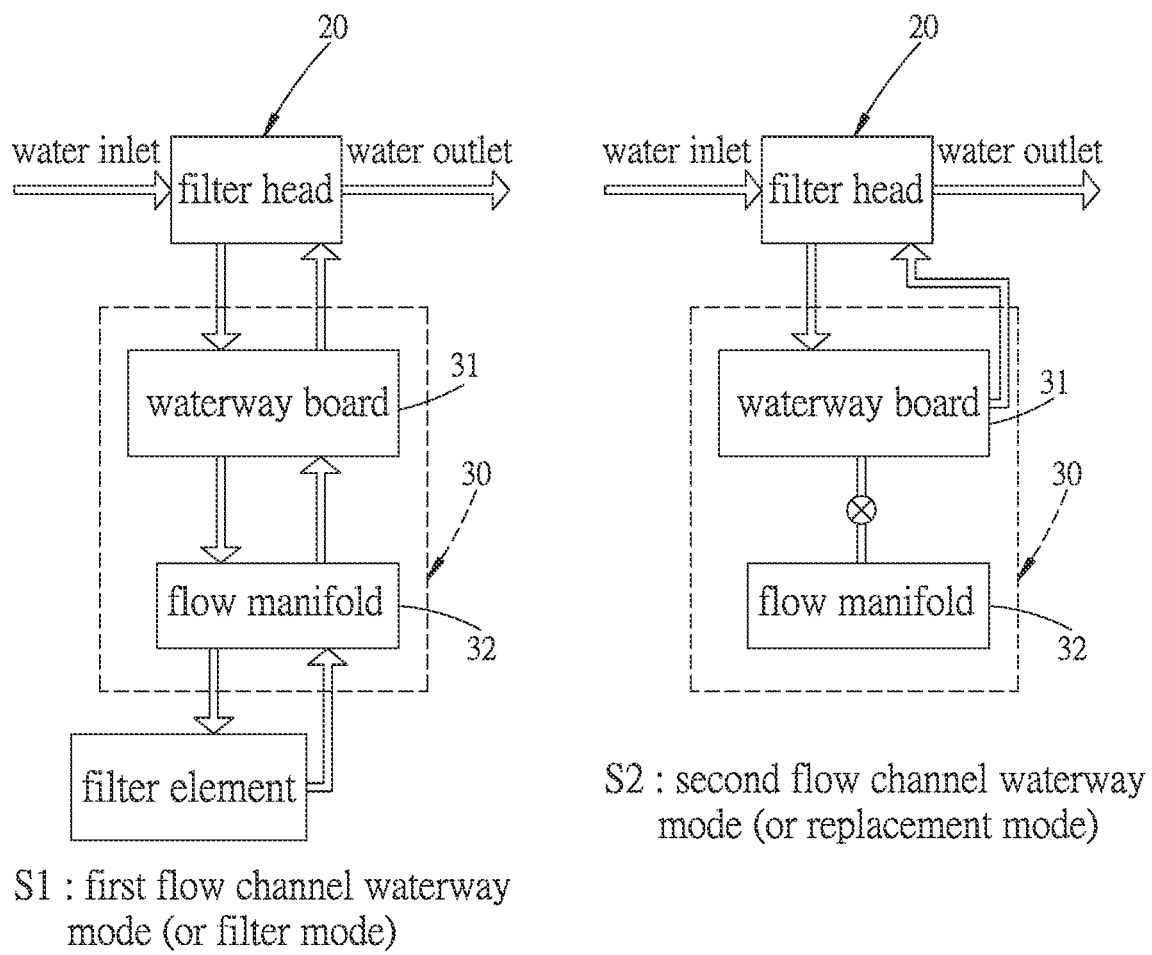
FIG. 1 is a flow chart of a water purifier in accordance with the preferred embodiment of the present invention.

Referring to the drawings and initially to FIGS. 1-5, a water purifier in accordance with the preferred embodiment of the present invention comprises a filter head 20, a flow channel control module 30, a housing 40, and a filter element 50.

The filter head 20 includes a water inlet port 21 to allow input of water and a water outlet port 22 to allow output of water.

The flow channel control module 30 is mounted in the filter head 20 and includes a waterway board 31 and a flow manifold (or divider or shunt) 32 arranged under the waterway board 31.

The waterway board 31 is fixed in the filter head 20. The waterway board 31 is juxtaposed to the flow manifold 32 from top to bottom so that the waterway board 31 and the flow manifold 32 are combined and mounted in the filter head 20. The waterway board 31 is provided with a water flow channel 311. The water flow channel 311 of the waterway board 31 has a first end provided with a water inlet hole 312 connected to the water inlet port 21 of the filter head 20 and a second end provided with a water outlet hole 313 connected to the water outlet port 22 of the filter head 20.

The flow manifold 32 is juxtaposed to the waterway board 31 and is rotatable relative to the waterway board 31. The flow manifold 32 is provided with a first passage 321 and a second passage 322. The first passage 321 of the flow manifold 32 is connected to the water flow channel 311 of the waterway board 31. The second passage 322 of the flow manifold 32 is connected to the water flow channel 311 of the waterway board 31.

The housing 40 is hollow and has a first opening 41 and a second opening 42. The first opening 41 of the housing 40 is connected with a lower end of the filter head 20. The second opening 42 of the housing 40 allows passage of the filter element 50.

The filter element 50 is detachably connected with the flow manifold 32 of the flow channel control module 30 and is rotated in concert with the flow manifold 32. The filter element 50 is directly rotated into and assembled with the flow manifold 32 of the flow channel control module 30 to drive the flow manifold 32 to rotate relative to the waterway board 31. The filter element 50 is connected to the first passage 321 and the second passage 322 of the flow manifold 32 respectively.

In practice, when the filter element 50 is mounted on the flow manifold 32 of the flow channel control module 30, the flow manifold 32 is driven by the filter element 50 and rotated relative to the waterway board 31 to a first position where the first passage 321 of the flow manifold 32 is connected to the water flow channel 311 of the waterway board 31, and the flow channel control module 30 is switched to a first flow channel waterway mode (or filter mode) S1 which functions as a lower waterway passing the filter element 50. On the contrary, when the filter element 50 is removed from the flow manifold 32 of the flow channel control module 30, the flow manifold 32 is driven by the filter element 50 and rotated relative to the waterway board 31 to a second position where the second passage 322 of the flow manifold 32 is connected to the water flow channel 311 of the waterway board 31, and the flow channel control module 30 is switched to a second flow channel waterway mode (or replacement mode) S2 which functions as an upper waterway without passing the filter element 50.

In the preferred embodiment of the present invention, the first flow channel waterway mode S1 is connected to the water inlet port 21 and the water outlet port 22 of the filter head 20, and the second flow channel waterway mode S2 is connected to the water inlet port 21 and the water outlet port 22 of the filter head 20. Thus, the first flow channel waterway mode S1 and the second flow channel waterway mode S2 have the same water inlet port 21 and the same water outlet port 22.

In the preferred embodiment of the present invention, a removable top cap 25 is mounted on the filter head 20 to cover the flow channel control module 30.

In the preferred embodiment of the present invention, the waterway board 31 of the flow channel control module 30 has a bottom face having a center provided with a first connecting portion 314, and the flow manifold 32 of the flow channel control module 30 has center provided with a second connecting portion 323 connected with and rotatable relative to the first connecting portion 314. The first connecting portion 314 is a circular recess, and the second connecting portion 323 is a circular projection. Thus, the second connecting portion 323 is juxtaposed to and inserted into the first connecting portion 314.

In the preferred embodiment of the present invention, the flow channel control module 30 further includes at least one first O-ring 315 mounted on the waterway board 31 and pressed between the filter head 20 and the waterway board 31 of the flow channel control module 30 to provide a first protection layer. The waterway board 31 is secured in the filter head 20 without rotation by the at least one first O-ring 315. The at least one first O-ring 315 secures the water inlet hole 312 and the water outlet hole 313 of the waterway board 31 to provide a closely watertight effect and to withstand a water impact. The first connecting portion 314 of the waterway board 31 has an inner edge provided with at least one retaining groove allowing insertion of the at least one first O-ring 315.

In the preferred embodiment of the present invention, the flow channel control module 30 further includes at least one second O-ring 316 mounted on the bottom face of the waterway board 31 and pressed between the waterway board 31 and the flow manifold 32 to provide a second protection layer. The at least one second O-ring 316 forms a vacuum state, so as to prevent a leakage under a lower pressure (about 60 psi) during the switching process between the first flow channel waterway mode S1 and the second flow channel waterway mode S2 so that the water will not leak outward. The at least one second O-ring 316 is arranged on an outer edge of the first connecting portion 314.

In the preferred embodiment of the present invention, the at least one first O-ring 315 and the at least one second O-ring 316 provide a closely watertight effect between the first connecting portion 314 of the waterway board 31 and the second connecting portion 323 of the flow manifold 32.

In the preferred embodiment of the present invention, the flow manifold 32 of the flow channel control module 30 has bottom provided with a recessed mounting portion 324 for mounting the filter element 50. The mounting portion 324 of the flow manifold 32 is opposite to the second connecting portion 323.

In the preferred embodiment of the present invention, the filter element 50 has an upper end provided with a mouth 51 extending through the second opening 42 of the housing 40 and detachably connected with the mounting portion 324 of the flow manifold 32.

In the preferred embodiment of the present invention, the water inlet port 21 of the filter head 20 is connected with a water inlet connector 23, and the water outlet port 22 of the filter head 20 is connected with a water outlet connector 24.

In the preferred embodiment of the present invention, when the first passage 321 of the flow manifold 32 is connected to the water flow channel 311 of the waterway board 31, the water inlet hole 312 of the waterway board 31, the water outlet hole 313 of the waterway board 31, the water flow channel 311 of the waterway board 31, the first passage 321 of the flow manifold 32, the water inlet port 21 of the filter head 20, the water outlet port 22 of the filter head 20, and the mouth 51 of the filter element 50 are connected to construct the first flow channel waterway mode S1.

In the preferred embodiment of the present invention, when the second passage 322 of the flow manifold 32 is connected to the water flow channel 311 of the waterway board 31, the water inlet hole 312 of the waterway board 31, the water outlet hole 313 of the waterway board 31, the water flow channel 311 of the waterway board 31, the second passage 322 of the flow manifold 32, the water inlet port 21 of the filter head 20, and the water outlet port 22 of the filter head 20 are connected to construct the second flow channel waterway mode S2.

In the first flow channel waterway mode S1, the water in turn flows through the water inlet port 21 of the filter head 20, the water inlet hole 312 of the waterway board 31, the water flow channel 311 of the waterway board 31, the first passage 321 of the flow manifold 32, the filter element 50, the second passage 322 of the flow manifold 32, the water flow channel 311 of the waterway board 31, the water outlet hole 313 of the waterway board 31, and the water outlet port 22 of the filter head 20, and are drained outward from the filter head 20.

In the second flow channel waterway mode S2, the water in turn flows through the water inlet port 21 of the filter head 20, the water inlet hole 312 of the waterway board 31, the water flow channel 311 of the waterway board 31, the second passage 322 of the flow manifold 32, the water flow channel 311 of the waterway board 31, the water outlet hole 313 of the waterway board 31, and the water outlet port 22 of the filter head 20, and are drained outward from the filter head 20.

In such a manner, when the filter element 50 is replaced, the filter head 20 is operated normally, and the water flows through the filter head 20 without leakage, so that the user does not have to turn off the water source for replacing the filter element 50, thereby facilitating replacement of the filter element 50. In addition, the water will not leak downward into the filter element 50 during the switching process of the first flow channel waterway mode S1 and the second flow channel waterway mode S2.

Figure 2:
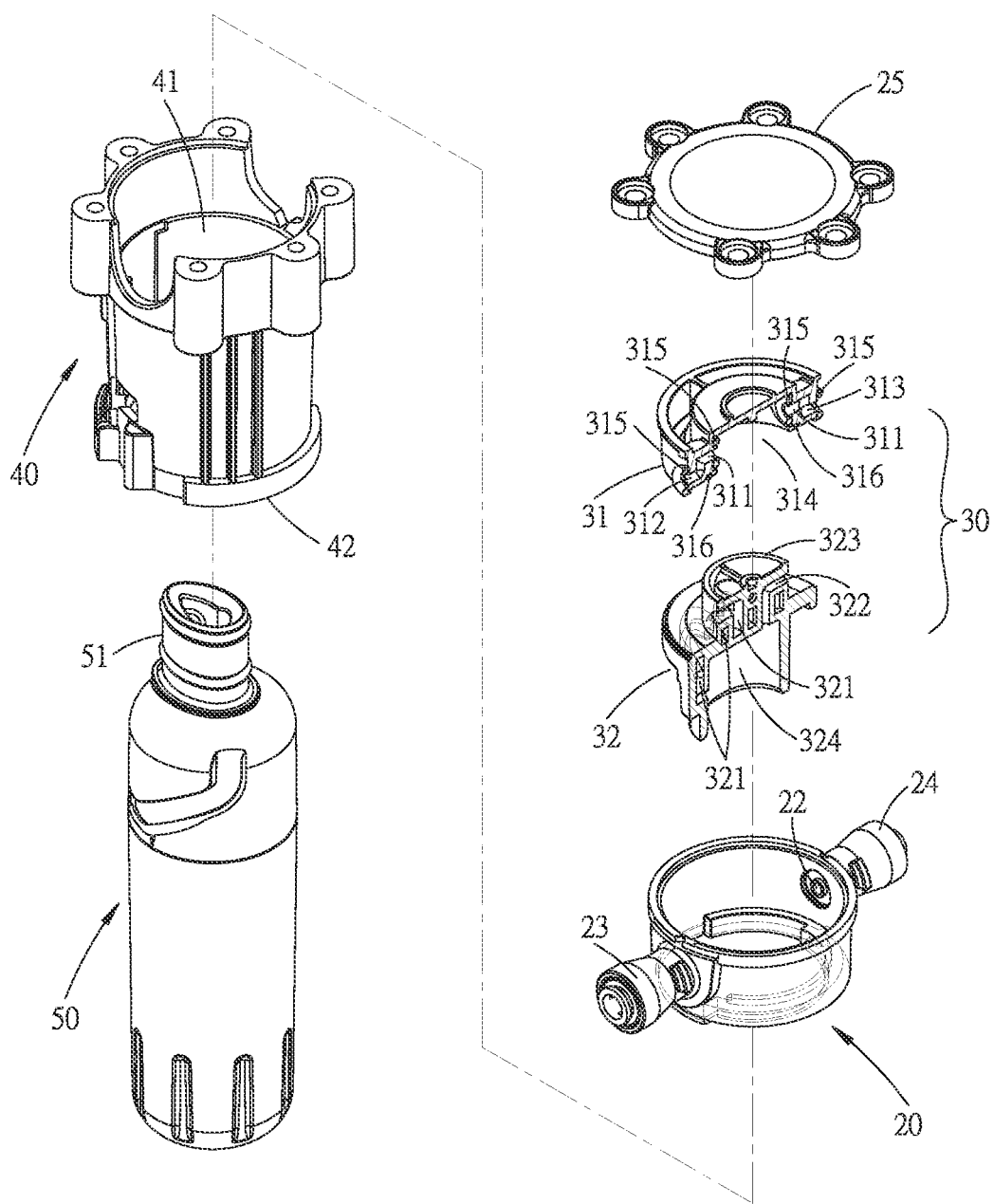
FIG. 2 is an exploded perspective view of a water purifier in accordance with the preferred embodiment of the present invention.
Figure 3:
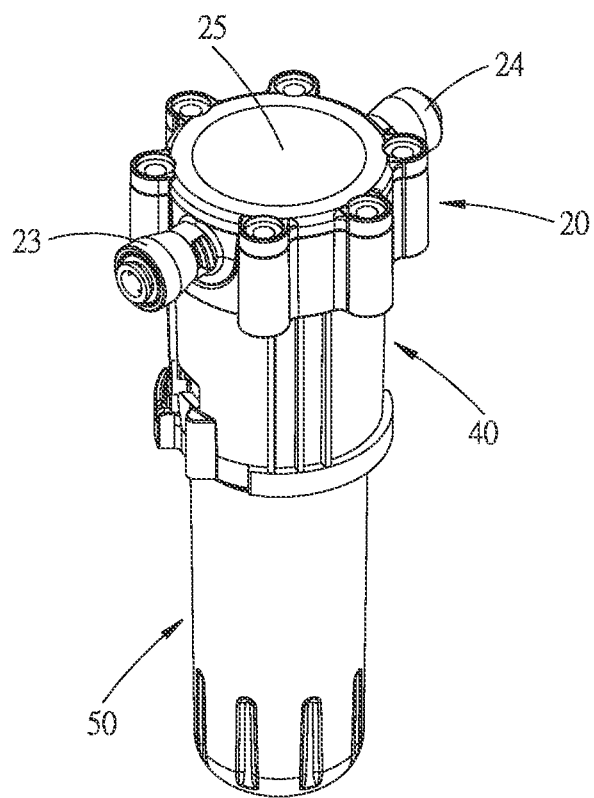
FIG. 3 is a perspective view of the water purifier in accordance with the preferred embodiment of the present invention.
Figure 4:
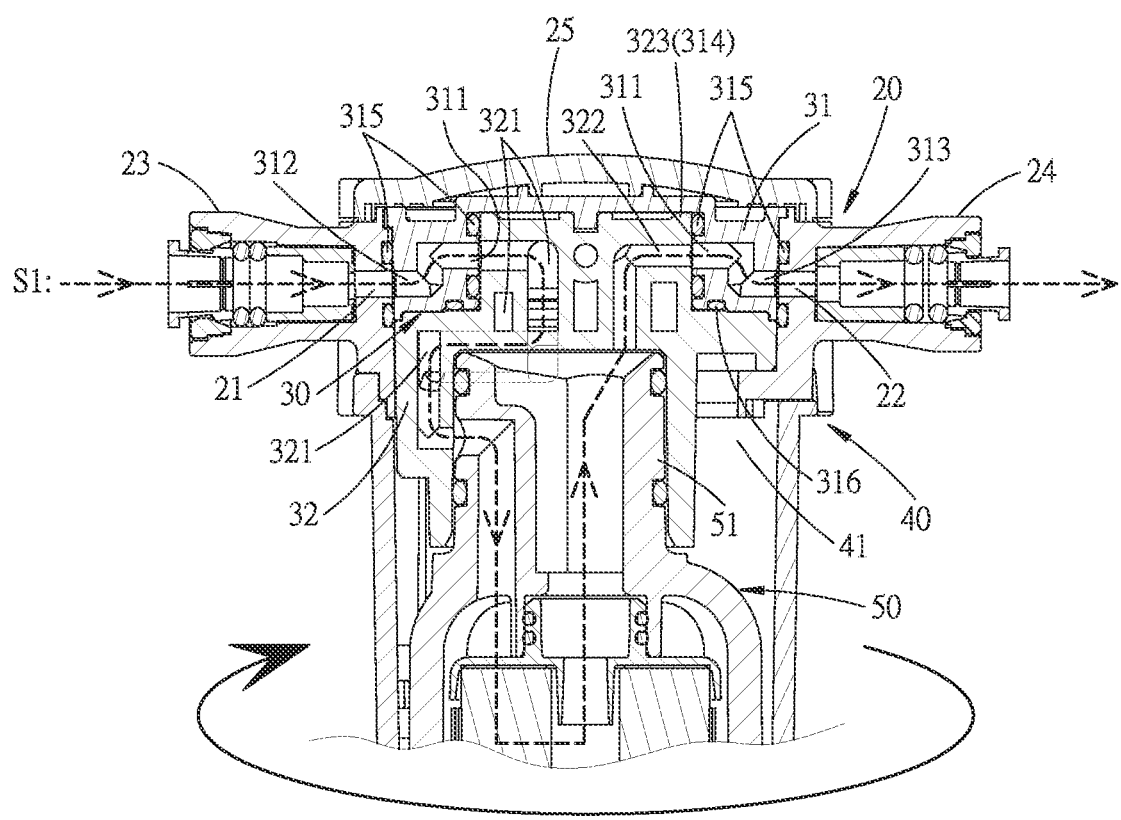
FIG. 4 is a partial cross-sectional view showing the flow channel control module is switched to a first flow channel waterway mode.
Figure 5:
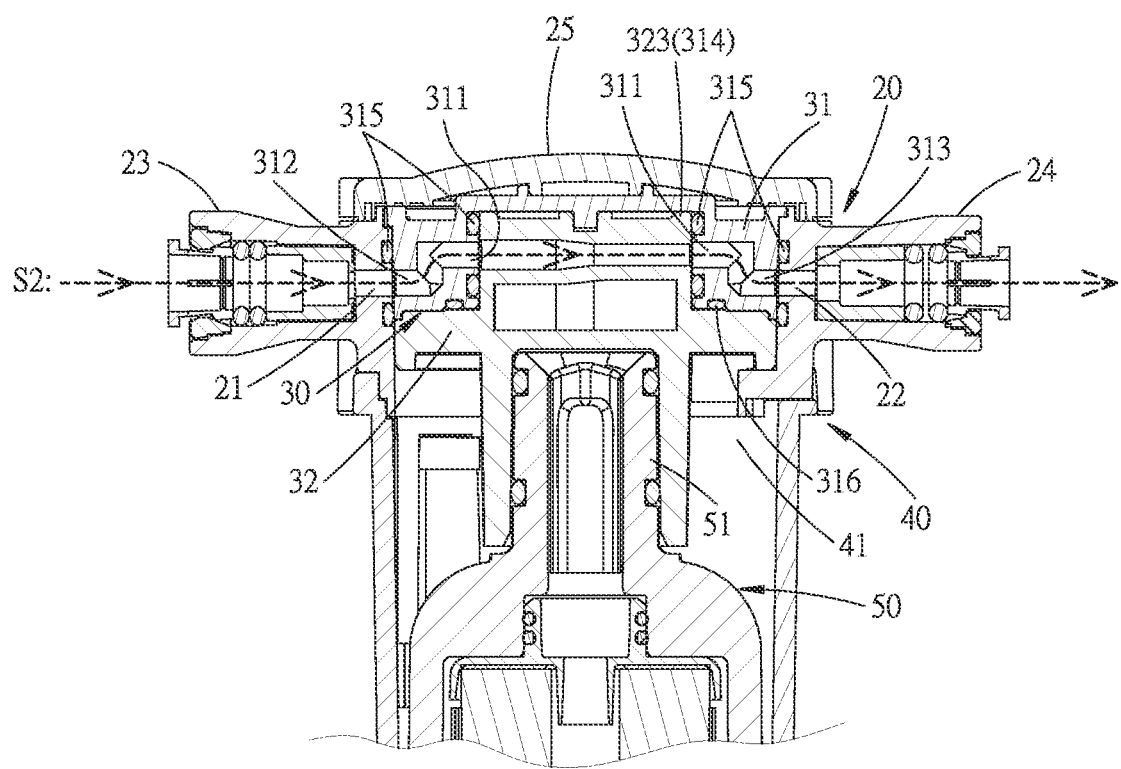
FIG. 5 is a partial cross-sectional view showing the flow channel control module is switched to a second flow channel waterway mode.
Figure 6:
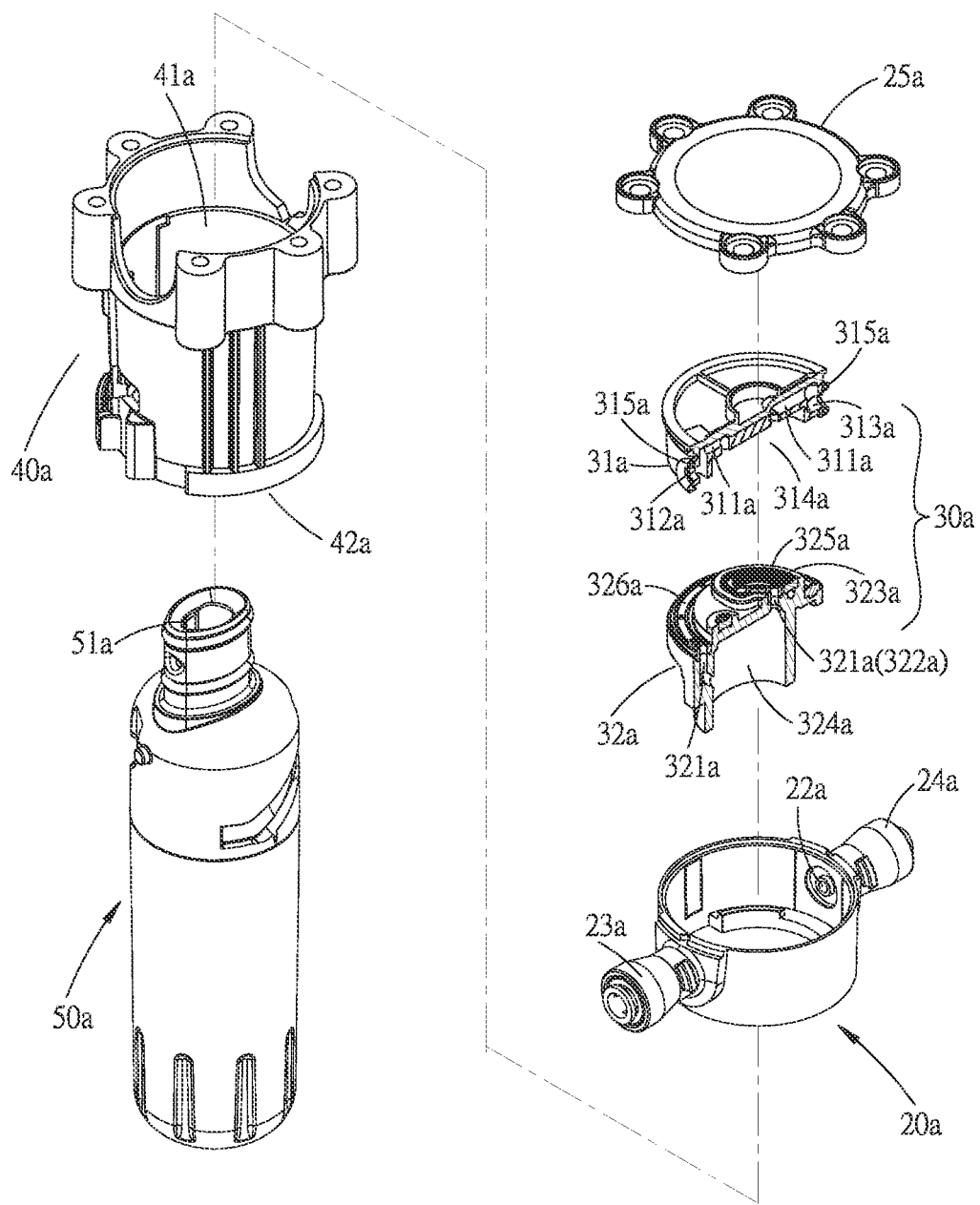
FIG. 6 is an exploded perspective view of a water purifier in accordance with a second preferred embodiment of the present invention.
Figure 7:
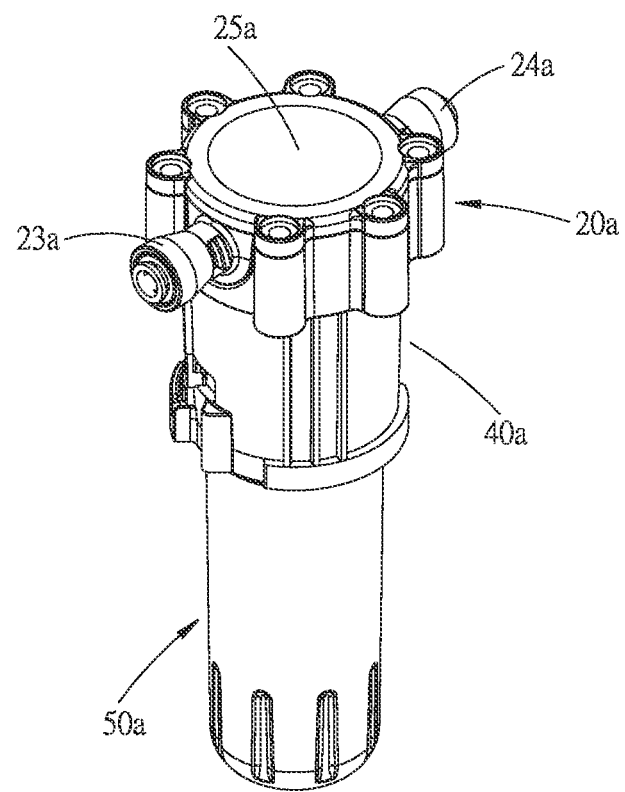
FIG. 7 is a perspective view of the water purifier in accordance with the second preferred embodiment of the present invention.
Figure 8:
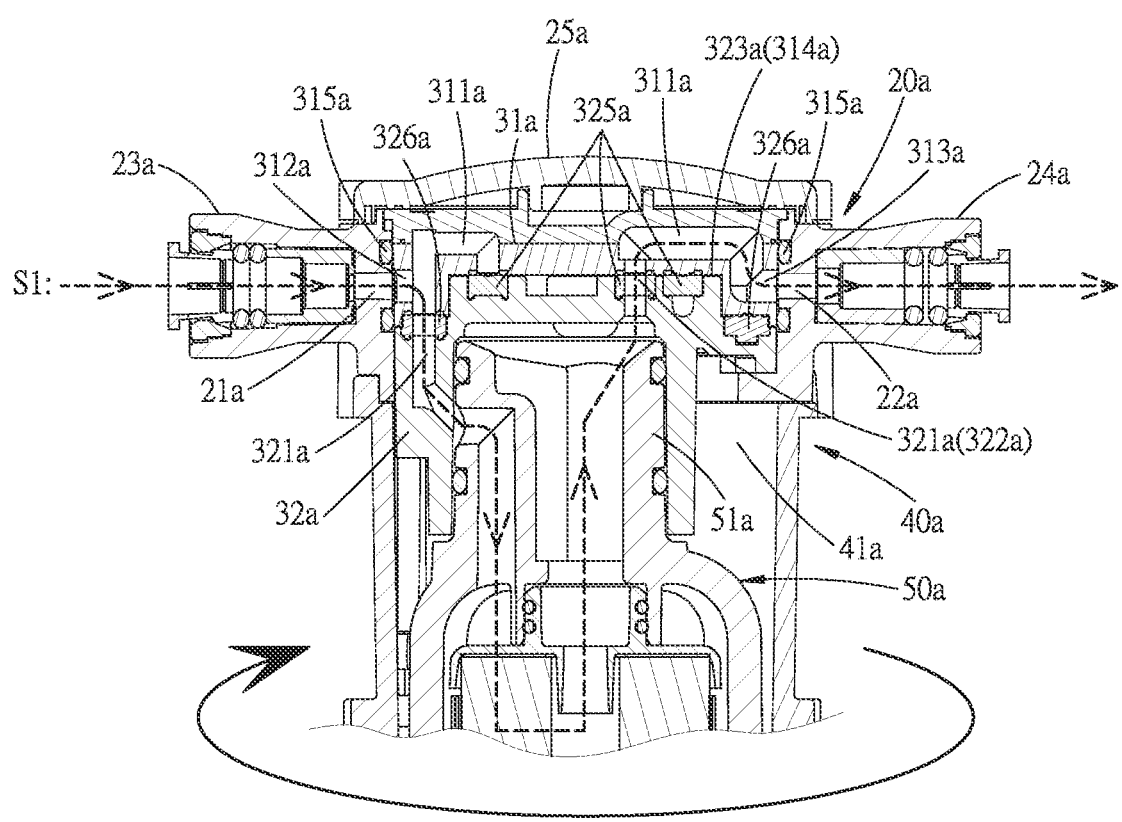
FIG. 8 is a partial cross-sectional view showing the flow channel control module is switched to a first flow channel waterway mode.
Figure 9:
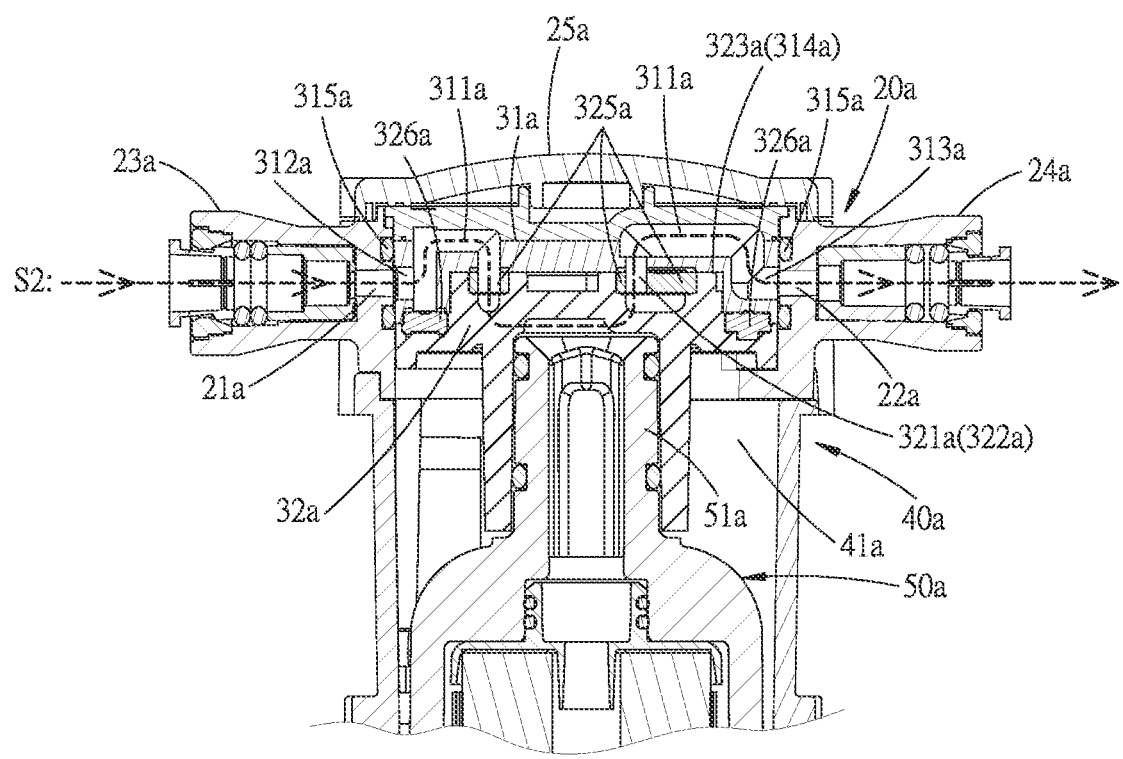
FIG. 9 is a partial cross-sectional view showing the flow channel control module is switched to a second flow channel waterway mode.

In operation, referring to FIGS. 4 and 5 with reference to FIGS. 1-3, when the filter element 50 drives and rotates the flow manifold 32 of the flow channel control module 30 to the first flow channel waterway mode S1, the first passage 321 of the flow manifold 32 is connected to the water flow channel 311 of the waterway board 31. At this time, the water inlet hole 312 of the waterway board 31, the water outlet hole 313 of the waterway board 31, the water flow channel 311 of the waterway board 31, the first passage 321 of the flow manifold 32, the water inlet port 21 of the filter head 20, the water outlet port 22 of the filter head 20, and the mouth 51 of the filter element 50 are connected to construct the first flow channel waterway mode 51. In such a manner, the at least one first O-ring 315 secures the water inlet hole 312 and the water outlet hole 313 of the waterway board 31 to provide a closely watertight effect and provides a first protection layer to withstand the impact of a water hammer. In addition, the at least one second O-ring 316 provides a second protection layer and forms a vacuum state, so as to prevent a leakage under a lower pressure during the switching process so that the water will not leak outward. Further, the at least one first O-ring 315 and the at least one second O-ring 316 provide a closely watertight effect between the first connecting portion 314 of the waterway board 31 and the second connecting portion 323 of the flow manifold 32.

Thus, the water in turn flows through the water inlet port 21 of the filter head 20, the water inlet hole 312 of the waterway board 31, the water flow channel 311 of the waterway board 31, the first passage 321 of the flow manifold 32, the filter element 50, the second passage 322 of the flow manifold 32, the water flow channel 311 of the waterway board 31, the water outlet hole 313 of the waterway board 31, and the water outlet port 22 of the filter head 20, and are drained outward from the filter head 20 as shown in FIG. 4.

On the contrary, when the filter element 50 drives and rotates the flow manifold 32 of the flow channel control module 30 to the second flow channel waterway mode S2, the second passage 322 of the flow manifold 32 is connected to the water flow channel 311 of the waterway board 31. At this time, the water inlet hole 312 of the waterway board 31, the water outlet hole 313 of the waterway board 31, the water flow channel 311 of the waterway board 31, the second passage 322 of the flow manifold 32, the water inlet port 21 of the filter head 20, and the water outlet port 22 of the filter head 20 are connected to construct the second flow channel waterway mode S2.

Thus, the water in turn flows through the water inlet port 21 of the filter head 20, the water inlet hole 312 of the waterway board 31, the water flow channel 311 of the waterway board 31, the second passage 322 of the flow manifold 32, the water flow channel 311 of the waterway board 31, the water outlet hole 313 of the waterway board 31, and the water outlet port 22 of the filter head 20, and are drained outward from the filter head 20 as shown in FIG. 5.

Accordingly, the flow channel control module 30 will not cause a leakage during the switching process between the first flow channel waterway mode S1 and the second flow channel waterway mode S2 so that the water will not leak outward.

Referring to FIGS. 6-9, the waterway board 31a of the flow channel control module 30a has a bottom face having a center provided with a first connecting portion 314a, and the flow manifold 32a of the flow channel control module 30a has center provided with a second connecting portion 323a connected with and rotatable relative to the first connecting portion 314a. Thus, the second connecting portion 323a is juxtaposed to and inserted into the first connecting portion 314a. The flow channel control module 30a further includes an upper gasket 325a mounted on a top of the second connecting portion 323a, and a lower gasket 326a mounted on a bottom of the second connecting portion 323a. Thus, the upper gasket 325a and the lower gasket 326a provide a closely watertight effect between the first connecting portion 314a of the waterway board 31a and the second connecting portion 323a of the flow manifold 32a.

Besides, the filter head 20a, the removable top cap 25a, the flow channel control module 30a, the housing 40a, and the filter element 50 have the same structure as shown in FIGS. 1-5. Thus, the filter head 20a includes a water inlet port 21a, a water outlet port 22a, a water inlet connector 23a, and a water outlet connector 24a. The flow channel control module 30a includes a waterway board 31a, a flow manifold 32a, and at least one first O-ring 315a. The waterway board 31a is provided with a water flow channel 311a having a water inlet hole 312a and a water outlet hole 313a. The flow manifold 32a is provided with a first passage 321a, a second passage 322a, and a mounting portion 324a. The housing 40a has a first opening 41a and a second opening 42a. The filter element 50a has a mouth 51a.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A water purifier comprising:
a filter head, a flow channel control module, a housing, and a filter element;
wherein:
the filter head includes a water inlet port and a water outlet port;
the flow channel control module is mounted in the filter head and includes a waterway board and a flow manifold arranged under the waterway board;
the waterway board is fixed in the filter head;
the waterway board is juxtaposed to the flow manifold;
the waterway board is provided with a water flow channel;

the water flow channel of the waterway board has a first end provided with a water inlet hole connected to the water inlet port of the filter head and a second end provided with a water outlet hole connected to the water outlet port of the filter head;

the flow manifold is rotatable relative to the waterway board;

the flow manifold is provided with a first passage and a second passage;

the housing is hollow and has a first opening and a second opening;

the first opening of the housing is connected with the filter head;

the filter element is detachably connected with the flow manifold of the flow channel control module and is rotated in concert with the flow manifold;

when the filter element is mounted on the flow manifold of the flow channel control module, the flow manifold is driven by the filter element and rotated relative to the waterway board to a first position where the first passage of the flow manifold is connected to the water flow channel of the waterway board, and the flow channel control module is switched to a first flow channel waterway mode (or filter mode); and when the filter element is removed from the flow manifold of the flow channel control module, the flow manifold is driven by the filter element and rotated relative to the waterway board to a second position where the second passage of the flow manifold is connected to the water flow channel of the waterway board, and the flow channel control module is switched to a second flow channel waterway mode (or replacement mode).

2. The water purifier as claimed in claim 1, wherein:
the first flow channel waterway mode is connected to the water inlet port and the water outlet port of the filter head;
the second flow channel waterway mode is connected to the water inlet port and the water outlet port of the filter head; and
the first flow channel waterway mode and the second flow channel waterway mode have the same water inlet port and the same water outlet port.

3. The water purifier as claimed in claim 1, further comprising:
a removable top cap mounted on the filter head.

4. The water purifier as claimed in claim 1, wherein the waterway board of the flow channel control module has a bottom face having a center provided with a first connecting portion, and the flow manifold of the flow channel control module has center provided with a second connecting portion connected with and rotatable relative to the first connecting portion.

5. The water purifier as claimed in claim 4, wherein:
the flow channel control module further includes at least one first O-ring mounted on the waterway board to provide a first protection layer;
the at least one first O-ring secures the water inlet hole and the water outlet hole of the waterway board to provide a closely watertight effect and to withstand a water impact; and
the first connecting portion of the waterway board has an inner edge provided with at least one retaining groove allowing insertion of the at least one first O-ring.

6. The water purifier as claimed in claim 5, wherein:
the flow channel control module further includes at least one second O-ring mounted on the bottom face of the waterway board to provide a second protection layer;
the at least one second O-ring prevents a leakage under a lower pressure during the switching process between the first flow channel waterway mode and the second flow channel waterway mode; and
the at least one second O-ring is arranged on an outer edge of the first connecting portion.

7. The water purifier as claimed in claim 1, wherein the water inlet port of the filter head is connected with a water inlet connector, and the water outlet port of the filter head is connected with a water outlet connector.

8. The water purifier as claimed in claim 1, wherein when the first passage of the flow manifold is connected to the water flow channel of the waterway board, the water inlet hole of the waterway board, the water outlet hole of the waterway board, the water flow channel of the waterway board, the first passage of the flow manifold, the water inlet port of the filter head, the water outlet port of the filter head, and the mouth of the filter element are connected to construct the first flow channel waterway mode.

9. The water purifier as claimed in claim 1, wherein when the second passage of the flow manifold is connected to the water flow channel of the waterway board, the water inlet hole of the waterway board, the water outlet hole of the waterway board, the water flow channel of the waterway board, the second passage of the flow manifold, the water inlet port of the filter head, and the water outlet port of the filter head are connected to construct the second flow channel waterway mode.

10. The water purifier as claimed in claim 1, wherein:
the waterway board of the flow channel control module has a bottom face having a center provided with a first connecting portion;
the flow manifold of the flow channel control module has center provided with a second connecting portion connected with and rotatable relative to the first connecting portion; and
the flow channel control module further includes an upper gasket mounted on a top of the second connecting portion, and a lower gasket mounted on a bottom of the second connecting portion.

* * * * *